(12) United States Patent
Natu et al.

(10) Patent No.: US 12,307,094 B2
(45) Date of Patent: May 20, 2025

(54) SYSTEM AND METHOD FOR MANAGING STORAGE SATURATION IN STORAGE SYSTEMS

(71) Applicant: Dell Products L.P., Round Rock, TX (US)

(72) Inventors: Gajanan S. Natu, Cary, NC (US); Rasa Raghavan, Verona, WI (US); Steven A. Morley, Mendon, MA (US)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 18/159,822

(22) Filed: Jan. 26, 2023

(65) Prior Publication Data

US 2024/0256138 A1 Aug. 1, 2024

(51) Int. Cl.
*G06F 3/06* (2006.01)

(52) U.S. Cl.
CPC .......... *G06F 3/0613* (2013.01); *G06F 3/0653* (2013.01); *G06F 3/0659* (2013.01); *G06F 3/0673* (2013.01)

(58) Field of Classification Search
CPC .... G06F 3/0613; G06F 3/0653; G06F 3/0659; G06F 3/0673; G06F 9/5083; G06F 9/5016; G06F 2209/5022; G06F 2209/508
See application file for complete search history.

(56) References Cited

U.S. PATENT DOCUMENTS

| | | | | |
|---|---|---|---|---|
| 2010/0157804 | A1* | 6/2010 | Bugenhagen | H04L 43/0894 370/252 |
| 2016/0179404 | A1* | 6/2016 | Nanduri | G06F 3/0613 711/103 |
| 2022/0229560 | A1* | 7/2022 | Dar | G06F 3/0653 |
| 2022/0357938 | A1* | 11/2022 | Lanford | G06F 9/45558 |
| 2023/0251785 | A1* | 8/2023 | Dutta | G06F 3/067 711/173 |
| 2024/0126442 | A1* | 4/2024 | Kabishcher | G06F 3/067 |
| 2024/0256141 | A1* | 8/2024 | Kronrod | G06F 3/0613 |

* cited by examiner

*Primary Examiner* — Tracy C Chan
(74) *Attorney, Agent, or Firm* — Brian J. Colandreo; Heath M. Sargeant; Holland & Knight LLP (57) ABSTRACT

A method, computer program product, and computing system for measuring a total storage device throughput value for a workload processed on a storage device within a storage array enclosure of a storage system. A maximum storage device throughput value may be determined for the workload. A storage device saturation value for the storage device may be determined based upon, at least in part, the total storage device throughput value for the workload and the maximum storage device throughput value for the workload. One or more IO requests may be processed on the storage device based upon, at least in part, the storage device saturation value determined for the storage device.

12 Claims, 6 Drawing Sheets

SYSTEM AND METHOD FOR MANAGING STORAGE SATURATION IN STORAGE SYSTEMS

BACKGROUND

Storing and safeguarding electronic content may be beneficial in modern business and elsewhere. Accordingly, various methodologies may be employed to protect and distribute such electronic content.

For example, input/output (IO) performance of a storage system depends on capabilities of IO processing software and hardware components such as network, CPU cores, log media and backend. To identify performance bottleneck, it is important to determine utilization/saturation of each component and identify component(s) that are limiting performance. By resolving performance bottleneck at the storage array backend, the overall performance of a storage system improves.

Typically, a storage array backend consists of storage drives and controllers. To estimate backend saturation/utilization, maximum supported backend throughput for a given backend configuration and workload is determined. Hardware performance characteristics for drives and storage controllers under standard test conditions is usually specified by vendors in terms of max supported IOPS (at a particular IO size) or bandwidth. Such information can be useful in estimating saturation of individual drive or controller when subjected to workload similar to that defined in standard test conditions. In reality, however, a storage array backend typically consists of interconnected controllers and drives with workloads far different than standard test conditions. As a result, hardware performance data based on standard test conditions cannot be directly used to estimate backend saturation of a storage array.

SUMMARY OF DISCLOSURE

In one example implementation, a computer-implemented method executed on a computing device may include, but is not limited to, measuring a total storage device throughput value for a workload processed on a storage device within a storage array enclosure of a storage system. A maximum storage device throughput value may be determined for the workload. A storage device saturation value for the storage device may be determined based upon, at least in part, the total storage device throughput value for the workload and the maximum storage device throughput value for the workload. One or more IO requests may be processed on the storage device based upon, at least in part, the storage device saturation value determined for the storage device.

One or more of the following example features may be included. The storage device may be a solid state drive (SSD) storage device. The storage device may be a hard disk drive (HDD) storage device. The workload may include a combination of one or more read IO requests and one or more write IO requests processed on the storage device. The workload may include an average IO request size. Determining the maximum storage device throughput value for the workload may include determining a maximum read throughput value for the average IO request size of the workload. Determining the maximum storage device throughput value for the workload may include determining a maximum write throughput value for the average IO request size of the workload.

In another example implementation, a computer program product resides on a computer readable medium that has a plurality of instructions stored on it. When executed by a processor, the instructions cause the processor to perform operations that may include, but are not limited to, measuring a total storage device throughput value for a workload processed on a storage device within a storage array enclosure of a storage system. A maximum storage device throughput value may be determined for the workload. A storage device saturation value for the storage device may be determined based upon, at least in part, the total storage device throughput value for the workload and the maximum storage device throughput value for the workload. One or more IO requests may be processed on the storage device based upon, at least in part, the storage device saturation value determined for the storage device.

One or more of the following example features may be included. The storage device may be a solid state drive (SSD) storage device. The storage device may be a hard disk drive (HDD) storage device. The workload may include a combination of one or more read IO requests and one or more write IO requests processed on the storage device. The workload may include an average IO request size. Determining the maximum storage device throughput value for the workload may include determining a maximum read throughput value for the average IO request size of the workload. Determining the maximum storage device throughput value for the workload may include determining a maximum write throughput value for the average IO request size of the workload.

In another example implementation, a computing system includes at least one processor and at least one memory architecture coupled with the at least one processor, wherein the at least one processor is configured to measure a total storage device throughput value for a workload processed on a storage device within a storage array enclosure of a storage system. A maximum storage device throughput value may be determined for the workload. A storage device saturation value for the storage device may be determined based upon, at least in part, the total storage device throughput value for the workload and the maximum storage device throughput value for the workload. One or more IO requests may be processed on the storage device based upon, at least in part, the storage device saturation value determined for the storage device.

One or more of the following example features may be included. The storage device may be a solid state drive (SSD) storage device. The storage device may be a hard disk drive (HDD) storage device. The workload may include a combination of one or more read IO requests and one or more write IO requests processed on the storage device. The workload may include an average IO request size. Determining the maximum storage device throughput value for the workload may include determining a maximum read throughput value for the average IO request size of the workload. Determining the maximum storage device throughput value for the workload may include determining a maximum write throughput value for the average IO request size of the workload.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example fea-

BRIEF DESCRIPTION OF THE DRAWINGS

Like reference symbols in the various drawings indicate like elements.

DETAILED DESCRIPTION

Figure 1:
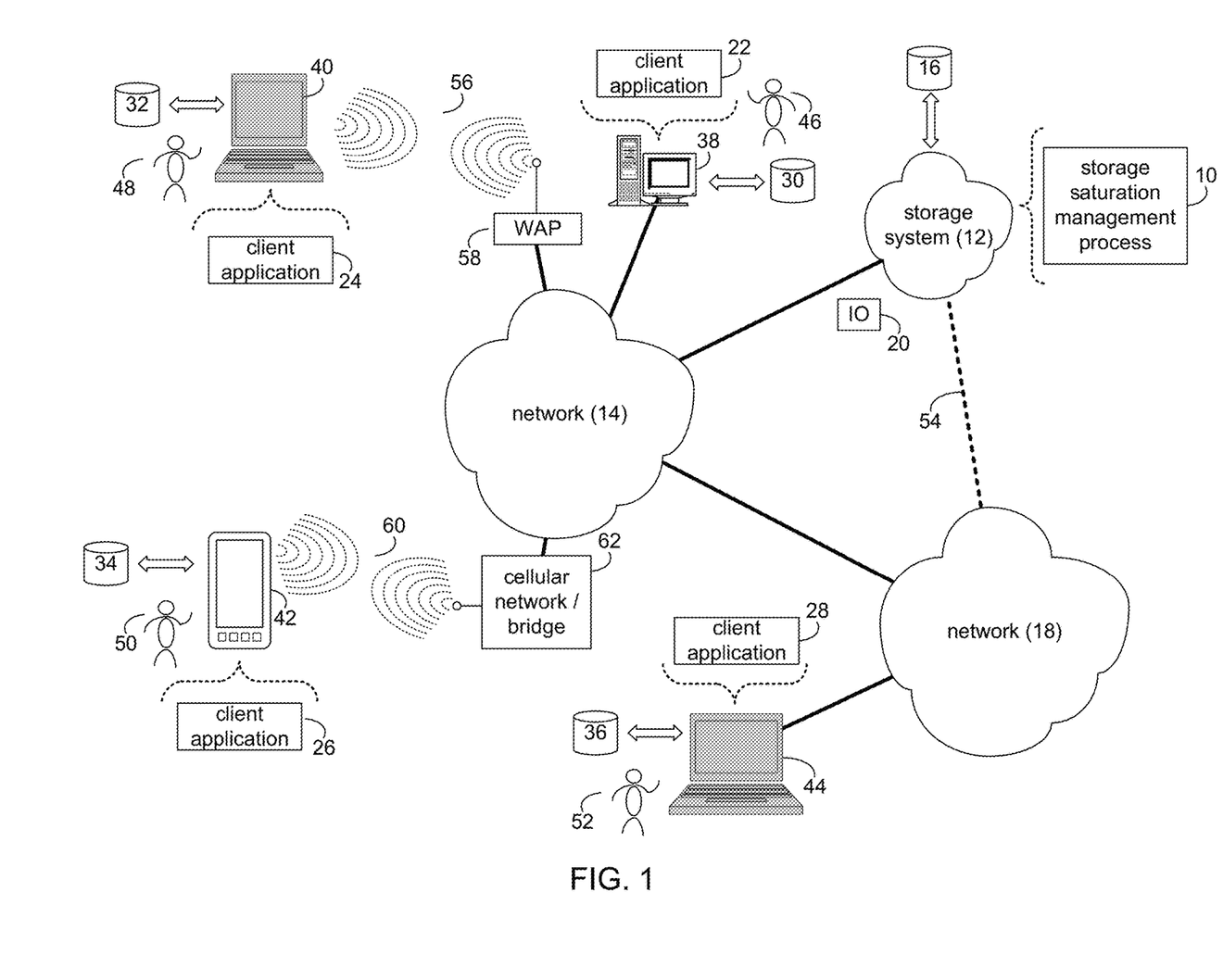
FIG. 1 is an example diagrammatic view of a storage system and a storage saturation management process coupled to a distributed computing network according to one or more example implementations of the disclosure.

System Overview:

Referring to FIG. 1, there is shown storage saturation management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage saturation management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage saturation management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage saturation management process, such as storage saturation management process 10 of FIG. 1, may include but is not limited to, measuring a total storage device throughput value for a workload processed on a storage device within a storage array enclosure of a storage system. A maximum storage device throughput value may be determined for the workload. A storage device saturation value for the storage device may be determined based upon, at least in part, the total storage device throughput value for the workload and the maximum storage device throughput value for the workload. One or more IO requests may be processed on the storage device based upon, at least in part, the storage device saturation value determined for the storage device.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
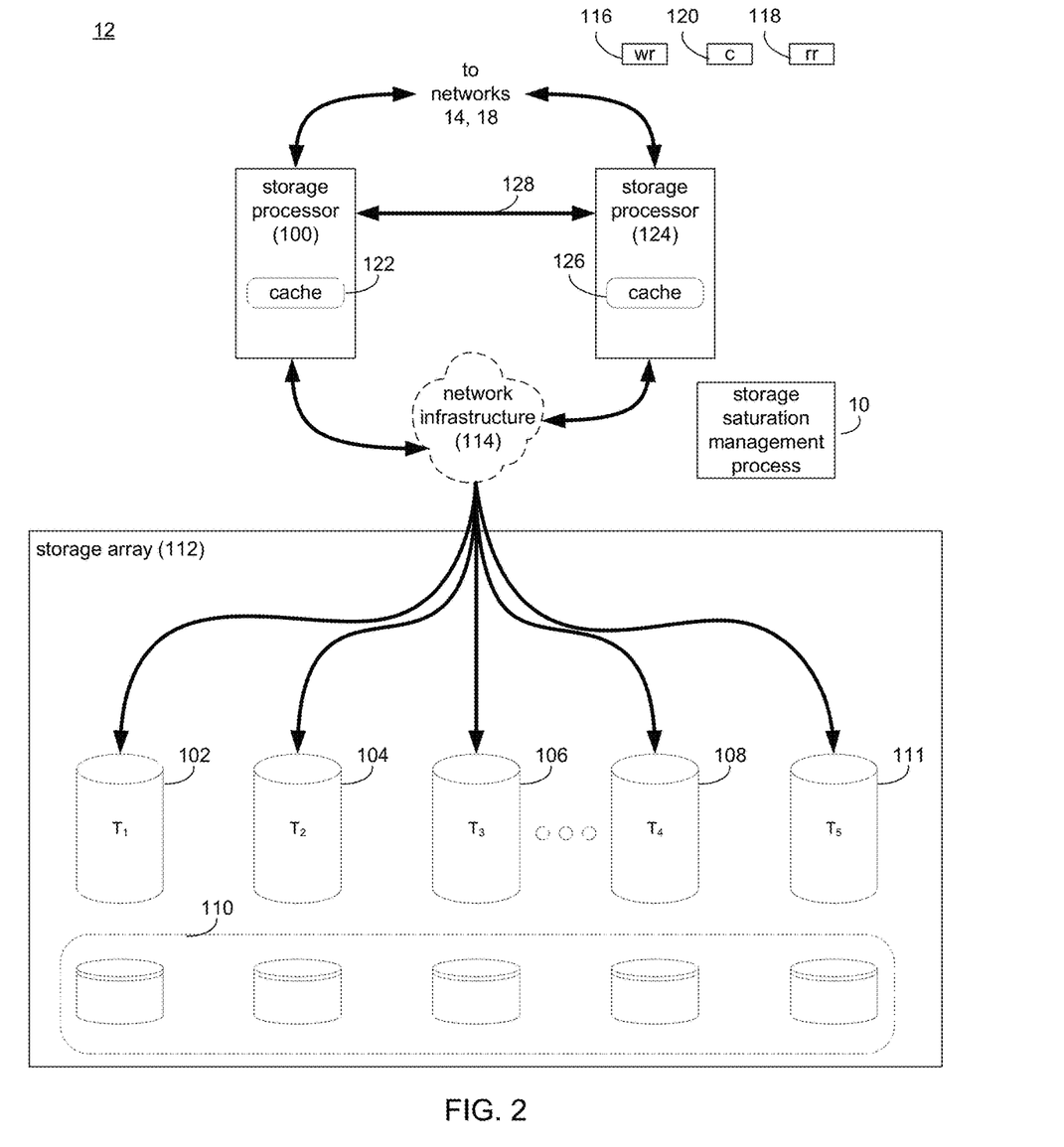
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form storage array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage saturation management process 10. The instruction sets and subroutines of storage saturation management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage saturation management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to storage array 112 (if frontend cache memory system 122 is configured as a write-through cache) or may subsequently write content 118 to storage array 112 (if frontend cache memory system 122 is configured as a write-back cache).

Storage array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of storage array 112, content 118 to be written to storage array 112 may be received from storage processor 100. Storage array 112 may initially store content 118 within backend cache memory system 124 prior to being stored on e.g. one or more of storage targets 102, 104, 106, 108, and coded target 110.

As discussed above, the instruction sets and subroutines of storage saturation management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage saturation management process 10 may be executed by one or more processors (not shown) and one or more memory architectures (not shown) included within storage array 112.

Further and as discussed above, during the operation of storage array 112, content (e.g., content 118) to be written to storage array 112 may be received from storage processor 100 and initially stored within backend cache memory system 124 prior to being stored on e.g. one or more of storage targets 102, 104, 106, 108, 110. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from being overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of adaptive flushing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of adaptive flushing process 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Storage Saturation Management Process:

Referring also to the examples of FIGS. 3-6 and in some implementations, storage saturation management process 10 may allow for the determination of enclosure saturation/utilization of a storage device, a storage controller, and/or a storage array enclosure including storage devices and storage controllers. As discussed above, input/output (IO) performance of a storage system depends on capabilities of IO processing software and hardware components such as network, CPU cores, log media and backend. To identify performance bottleneck, it is important to determine utilization/saturation of each component and identify component(s) that are limiting performance. By resolving performance bottleneck at the storage array backend, the overall performance of a storage system improves.

Typically, a storage array backend consists of storage drives and controllers. To estimate backend saturation/utilization, maximum supported backend throughput for a given backend configuration and workload is determined. Hardware performance characteristics for drives and storage controllers under standard test conditions is usually specified by vendors in terms of max supported IOPS (at a particular IO size) or bandwidth. Such information can be useful in estimating saturation of individual drive or controller when subjected to workload similar to that defined in standard test conditions. In reality, however, a storage array backend typically consists of interconnected controllers and drives with workloads far different than standard test conditions. As a result, hardware performance data based on standard test conditions cannot be directly used to estimate backend saturation of a storage array. Accordingly, implementations of the present disclosure estimate backend saturation using maximum supported backend throughput based on configuration and actual workload properties (e.g., IOPS, IO sizes and read/write ratio).

Figure 4:
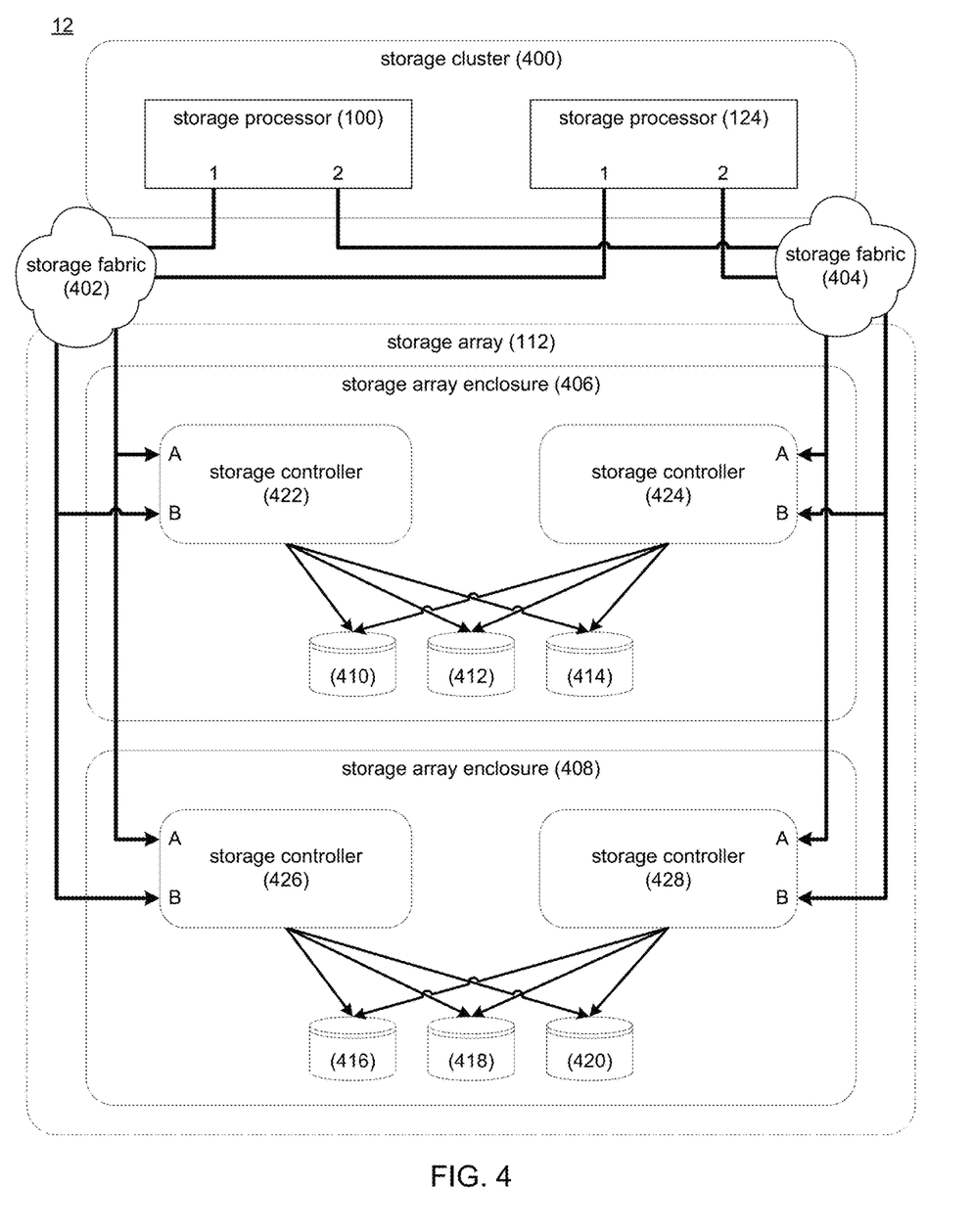
FIG. 4 is an example diagrammatic view of the storage system of FIG. 1 according to one or more example implementations of the disclosure.

Referring also to FIG. 4 and in some implementations, a storage processor (e.g., storage processor 100) may include one or more central processing units (CPUs) with one or more cores, a cache memory system (e.g., cache memory system 122), and one or more network interface cards (NICs). As discussed above and in some implementations, the storage processor (e.g., storage processor 100) may be part of an active-active storage cluster (e.g., storage cluster 400 with storage processor 124) communicatively coupled with a storage array or storage array (e.g., storage array 112). In some implementations, the storage array (e.g., storage array 112) may include one or more storage devices. In some implementations, the storage array may be a non-volatile memory disk array with one or more solid state drives (SSDs). The storage processors may interact with the one or more SSDs via the non-volatile memory express (NVMe™) protocol or standard. NVMe is a trademark of NVM Express, Inc. in the United States, other countries, or both. In this manner, storage devices, such as SSDs, that are configured to communicate with a storage processor via the NVMe protocol may generally be referred to as NVMe devices.

As is known in the art, non-volatile memory express (NVMe) may generally include a host controller interface and storage protocol configured to transfer data between client systems and SSDs over a Peripheral Component Interconnect Express (PCIe) bus. In some implementations, one or more storage processors (e.g., storage processor 100 and storage processor 124) may be configured to be communicatively coupled to a storage array (e.g., storage array 112) via one or more storage fabrics (e.g., storage fabrics 402, 404). In some implementations, storage fabrics may be internal to storage system 12 and/or may be shared with clients (e.g., as shown in network 14 of FIG. 1). In this manner and as will be discussed in greater detail below, the storage system (e.g., storage system 12) may include a plurality of storage processors configured to receive a plurality of I/O requests (e.g., write requests, read requests, etc.).

In some implementations, storage processors 100, 124 may be communicatively coupled with storage array 112 via a non-volatile memory express over fabrics protocol (NVMe-oF). NVMe-oF is a trademark of NVM Express, Inc. in the United States, other countries, or both. NVM Express over Fabrics defines a common architecture that supports a range of storage networking fabrics for NVMe block storage protocol over a storage networking fabric. This includes enabling a front-side interface into storage systems, scaling out to large numbers of NVMe devices and extending the distance within a datacenter over which NVMe devices and NVMe subsystems can be accessed.

In some implementations, storage array 112 may include one or more storage array enclosures. In some implementations, a storage array enclosure (e.g., storage array enclosure 406, 408) may generally include a drive carrier, one or more storage devices, a midplane, one or more storage controllers, and/or one or more persistent memory devices. In some implementations, the driver carrier of storage array enclosure 406 may be configured to hold one or more storage devices (e.g., storage devices 410, 412, 414) and the driver carrier of storage array enclosure 408 may be configured to hold one or more storage devices (e.g., storage devices 416, 418, 420). Storage array enclosure 406 may include a midplane configured to distribute power and signals to components within the storage array enclosure. Storage controllers (e.g., storage controllers 422, 424 of storage array enclosure 406 and storage controllers 426, 428 of storage array enclosure 408) may generally include a module configured to support, control, and monitor the storage array enclosure. In some implementations, storage controllers 422, 424, 426, 428 may include various input and/or output connectors for coupling one or more storage processors (e.g., storage processors 100, 124) to one or more storage devices (e.g., storage devices 410, 412, 414, 416, 418, 420).

As will be discussed in greater detail below, saturation of the storage system may be defined as the combination of the saturation of the physical links between the storage processors and the storage controllers, the saturation of the storage controllers, the saturation of the physical links between the storage controllers and the storage devices, and the saturation of the storage devices themselves. In this manner, storage saturation management process 10 may determine and use storage array enclosure saturation, storage controller saturation, and storage device saturation to enhance the processing of IO requests in the storage system. For example, with the saturation for each of the storage device, the storage controller, and the storage array enclosure, storage saturation management process 10 may perform better e.g., load balancing, SSD drive wear monitoring, storage device utilization, storage controller utilization, and/or storage array enclosure utilization.

Figure 3:
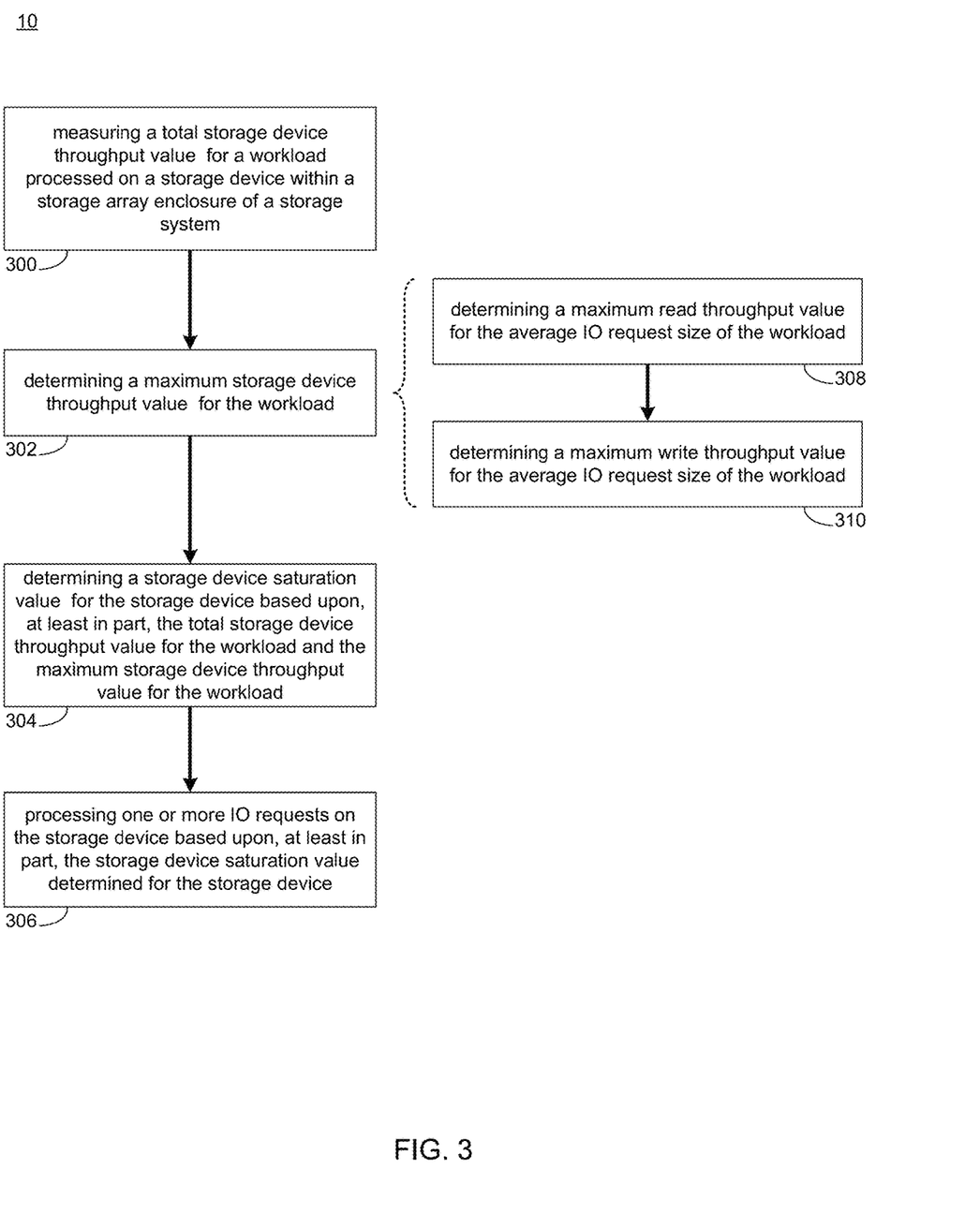
FIG. 3 is an example flowchart of storage saturation management process according to one or more example implementations of the disclosure.

Storage Device Saturation:

In some implementations, storage saturation management process 10 may measure 300 a total storage device throughput value for a workload processed on a storage device within a storage array enclosure of a storage system. A maximum storage device throughput value may be determined 302 for the workload. A storage device saturation value for the storage device may be determined 304 based upon, at least in part, the total storage device throughput value for the workload and the maximum storage device throughput value for the workload. One or more IO requests may be processed 306 on the storage device based upon, at least in part, the storage device saturation value determined for the storage device.

For example and as discussed above, host IO workload properties (e.g., IOPS, read/write ratio, IO size) and actual IO workload seen by storage devices can be significantly different because of IO coalescing, alignment, mirroring, and amplification. As a result, it is important to measure IOPS and IO sizes at the drive level for calculating drive saturation rather than relying on host IO workload properties.

In some implementations, parameters impacting storage device maximum throughput can be divided into two groups: 1) storage device workload properties (i.e., IO type (reads or writes), average IO size, read/write ratio, random vs sequential IO, RAID configuration); and 2) storage device properties (i.e., drive model, drive type, queue depth and drive capacity and utilization). The purpose of a storage device saturation model is to capture the impact of primary parameters, IO type, and IO size on maximum storage device throughput while keeping all other parameters constant with realistic values. In one example, storage device qualification tests were conducted for various read/write ratios, IO sizes. In this example, prefilling of the storage device is run before each workload to ensure steady state. The following representative values were chosen for other storage device performance parameters: random reads and writes, drive utilization: drives prefilled, and a queue depth of 32.

From this example using an SSD storage device, it is observed that maximum storage device IOPS and IO size follow an inverse relationship for read and write IOPS across various drive models (e.g., for SSD storage devices). Using this correlation, maximum read and write IOPS for any read IO size (e.g., read size "r_sz" is greater than four kilobytes) and write IO size (write size "w_sz" is greater than four kilobytes) can be written as shown below in Equations 1-2:

$$\text{Max\_Drive\_IOPS}_{read@r\_sz} = C_{read} * (r\_sz)^a \quad (1)$$

$$\text{Max\_Drive\_IOPS}_{write@w\_sz} = C_{write} * (w\_sz)^b \quad (2)$$

where $C_{read}$, $C_{write}$, a and b are constants for a storage device model. The exponents a and b are negative and nearly equal to −1. Thus, the above model can be also approximated as shown in Equations 3-4:

$$\text{Max\_Drive\_IOPS}_{read@r\_sz} = C_{read}/r\_sz \quad (3)$$

$$\text{Max\_Drive\_IOPS}_{write@w\_sz} = C_{write}/w\_sz \quad (4)$$

Using Equations 3-4, the maximum storage device throughput may be estimated for any IO provided that that the one reference maximum storage device throughput is known. For example, suppose that a maximum storage device throughput value is known for a particular IO size (e.g., four kilobytes). In this example, the maximum storage device throughput value may be generalized to any IO size as shown below in Equations 5 and 6:

$$\text{Max\_Drive\_IOPS}_{read@r\_sz}/\text{Max\_Drive\_IOPS}_{read@4kB} = 4/r\_sz$$

$$\text{Max\_Drive\_IOPS}_{read@r\_sz} = \text{Max\_Drive\_IOPS}_{read@4kB} * 4/r\_sz \quad (5)$$

and $$\text{Max\_Drive\_IOPS}_{write@r\_sz} = \text{Max\_Drive\_IOPS}_{write@4kB} * 4/w\_sz \quad (6)$$

As shown in Equations 1-6, throughput is defined as input/output operations per second (IOPS). However, it will be appreciated that this is for example purposes only and that other throughput metrics may be used within the present disclosure.

In some implementations, storage saturation management process 10 may measure 300 a total storage device throughput value for a workload processed on a storage device within a storage array enclosure of a storage system. For example, storage saturation management process 10 may receive and process a plurality of IO requests on a storage device. A storage device is a container configured to store some amount of data within a storage system. In one example, the storage device may be a solid state drive (SSD) storage device. In another example, the storage device may be a hard disk drive (HDD) storage device. In the following examples, reference will be made to an SSD storage device. As such, it will be appreciated that measuring the total storage device throughput and determining the maximum storage device throughput value for the workload for an HDD storage device may include specific implementation details unique to HDD storage devices within the scope of the present disclosure. As various IO requests are processed on the storage device, storage saturation management process 10 may measure 300 the total storage device throughput value for the workload. The workload may include a combination of one or more read IO requests and one or more write IO requests processed on the storage device over a particular interval of time.

Accordingly, storage saturation management process 10 may measure the combination of read IO requests and write IO requests processed on the storage device over the defined time interval. In some implementations, the time interval may be user-defined and/or a default value. When measuring 300 the workload of IO requests performed on the storage device, storage saturation management process 10 may determine the average IO request size. An average IO request size is the average amount of data per IO request during the defined time interval. In one example, the average IO request size is four kilobytes. In another example, the average IO request size is eight kilobytes. As such, it will be appreciated that any average IO request may be measured 300 in the workload of IO requests. As shown above in Equations 5-6 and as will be discussed in greater detail below, storage saturation management process 10 may use a ratio of known maximum storage device throughput value with the known average IO request size to determine a maximum storage device throughput value for a new average IO request size.

In some implementations, storage saturation management process 10 may periodically measure the workload for a specific storage device to determine if there has been a change. In one example, suppose storage saturation management process 10 determines that the average IO request size changes from four kilobytes to 256 kilobytes. In this example, storage saturation management process 10 may measure for the total storage device throughput value for the changed workload on the storage device. However, it will be appreciated that storage saturation management process 10 may measure the total storage device throughput value based on a time threshold (e.g., iteratively after some period of time), a threshold number of IO requests processed, a threshold number of read IO requests processed, a threshold number of write IO requests processed, or any other metric within the scope of the present disclosure.

Suppose that storage saturation management process 10 measures 300 the throughput of a workload of read IO requests represented as 1,400 IOPS and of work IO requests represented as 600 IOPS when processing IO requests on storage device 410. Further suppose that the average read IO request size is e.g., 256 kilobytes and that the average write IO request size is e.g., 256 kilobytes. In this example, storage saturation management process 10 may measure the read IO request throughput and the write IO request throughput separately. Accordingly, storage saturation management process 10 may measure 300 the total storage device throughput by combining the read IO request throughput and the write IO request throughput (e.g., 1,400 IOPS+600 IOPS=2,000 IOPS). As will be discussed in greater detail below, storage saturation management process 10 may use this value to determine the storage device throughput saturation for the workload.

In some implementations, storage saturation management process 10 may determine 302 a maximum storage device throughput value for the workload. A maximum storage device throughput for a particular workload may represent the maximum throughput the storage device can process for the given workload. In some implementations, storage saturation management process 10 may determine 302 the maximum storage device throughput value for a workload as a function of: a maximum read throughput value, a maximum write throughput value for the workload, and the average IO request size.

In some implementations, determining 302 the maximum storage device throughput value for the workload may include determining 308 a maximum read throughput value for the average IO request size of the workload. For example, a maximum read throughput value may represent the maximum throughput for the storage device when processing read IO requests. Continuing with the above example, suppose storage saturation management process 10 determines that the maximum read throughput value for storage device 410 is 300,998 IOPS with four kilobyte read IO requests. In some implementations, this value may be user-defined, vendor-defined, defined by storage saturation management process 10, and/or predefined within storage device 410. Accordingly, storage saturation management process 10 may use the maximum read throughput value of 300,998 with the average read IO request size of four kilobytes and the average read IO request size of 256 kilobytes in the workload for storage device 410 to determine 308 a maximum read throughput value. For example, storage saturation management process 10 may determine 308 the maximum read throughput value as shown below in Equation 7:

$$\text{Max\_Drive\_IOPS}_{read@r\_256kB} = 300{,}998 * 4/256 = 4{,}703 \; IOPS \quad (7)$$

Accordingly, for the workload with an average read IO request size of 256 kilobytes, storage saturation management process 10 may determine 308 a maximum read throughput value of 4,703 IOPS.

In some implementations, determining 302 the maximum storage device throughput value for the workload may include determining 310 a maximum write throughput value for the average IO request size of the workload. For example, a maximum write throughput value may represent the maximum throughput for the storage device when processing write IO requests. Continuing with the above example, suppose storage saturation management process 10 determines that the maximum write throughput value for storage device 410 is 82,104 IOPS with four kilobyte write IO requests. In some implementations, this value may be user-defined, vendor-defined, defined by storage saturation management process 10, and/or predefined within storage device 410. Accordingly, storage saturation management process 10 may use the maximum write throughput value of 82,103 with the average write IO request size of four kilobytes and the average write IO request size of 256 kilobytes in the workload for storage device 410 to determine 310 a maximum write throughput value. For example, storage saturation management process 10 may determine 310 the maximum write throughput value as shown below in Equation 8:

$$\text{Max\_Drive\_IOPS}_{write@r\_256kB} = 82{,}104 * 4/256 = 1{,}283 \; IOPS \quad (8)$$

Accordingly, for the workload with an average write IO request size of 256 kilobytes, storage saturation management process 10 may determine 310 a maximum write throughput value of 1,283 IOPS.

In some implementations, storage saturation management process 10 may determine 302 maximum storage device throughput value for the workload as a function of a read IO ratio and an average service time per IO request. For example, assume the workload for a storage device includes a read IO throughput value (e.g., number of read IOPS) for an average read IO size and a write IO throughput value (e.g., number of write IOPS) for an average write IO size. The read ratio is defined as shown below in Equation 9:

$$r = R/(R + W) \quad (9)$$

where r is the read ratio, R is read IO throughput, and W is the write IO throughput.

Using the estimated maximum read throughput value and the maximum write throughput value for the storage device, storage saturation management process 10 may determine an average service time per IO request as shown in Equation 10:

$$s = \frac{1}{(r/\text{Max\_Drive\_IOPS}_{read@r\_sz}) + [(1-r)/\text{Max\_Drive\_IOPS}_{write@w\_sz}]} \quad (10)$$

where s is the average service time per IO request, r is the read ratio, $\text{Max\_Drive\_IOPS}_{read@r\_sz}$ is the maximum read throughput for the storage device at the average read IO size of r_sz, and $\text{Max\_Drive\_IOPS}_{write@w\_sz}$ is the maximum write throughput for the storage device at the average write IO size of w_sz.

Returning to the above example, storage saturation management process 10 may determine the read ratio and service time per IO request as shown below in Equations 11-12:

$$r = 1400/(1400 + 600) = 0.7 \quad (11)$$

$$s = (0.7/4703) + \left[\frac{1 - 0.7}{1283}\right] = 3.827e^{-4} \quad (12)$$

With the service time per IO request, storage saturation management process 10 may determine 302 the maximum storage device throughput value for the workload as shown in Equation 13 below:

$$1/s = 1/3.827e^{-4} = 2{,}613 \; IOPS \quad (13)$$

As shown in Equation 13, the maximum storage device throughput value for the workload is 2,613 IOPS. As will be discussed in greater detail below, storage saturation management process 10 may use the maximum storage device throughput value to determine the storage device saturation value.

In some implementations, storage saturation management process 10 may determine 304 a storage device saturation value for the storage device based upon, at least in part, the total storage device throughput value for the workload and the maximum storage device throughput value for the workload. A storage device saturation value may represent the ratio of the total measured storage device throughput value to the maximum storage device throughput value for the workload. For example, storage saturation management process 10 may use the total storage device throughput value for the workload and the maximum storage device throughput value for the workload to determine 304 the storage device saturation value as shown below in Equation 14:

$$\text{Storage Device}_{Saturation} = \text{total throughput value/maximum throughput value} \quad (14)$$

Continuing with the above example, storage saturation management process 10 may determine 304 the storage device saturation value as shown in Equation 15:

$$\text{Storage Device}_{Saturation} = 2{,}000 \ IOPS/2613 \ IOPS = 77\% \quad (15)$$

In this example, storage saturation management process 10 may determine 304 that the storage device saturation value for storage device 410 with the average IO request size of 256 kilobytes and 1,400 IOPS in read IO throughput and 600 in write IO throughput is 77%.

In some implementations, storage saturation management process 10 may process 306 one or more IO requests on the storage device based upon, at least in part, the storage device saturation value determined for the storage device. For example, storage saturation management process 10 may compare the storage device saturation value against one or more thresholds to determine whether or not to adjust the processing of IO requests on the storage device. In one example, storage saturation management process 10 may compare the storage device saturation value against an oversaturation threshold for the storage device and/or for the storage array enclosure. For example, storage saturation management process 10 may compare the storage device saturation value of multiple storage devices to determine whether to perform load balancing between the storage devices. In another example, storage saturation management process 10 may generate an alert to an administrator of the storage system to alert when the storage device saturation value exceeds or descends below a predefined saturation threshold. In another example, storage saturation management process 10 may adjust the IO request processing rate, a queue depth for IO requests for a particular storage device, the IO size, etc. Accordingly, storage saturation management process 10 may perform various remedial or optimizations of the processing of IO requests using the storage device saturation value.

Figure 5:
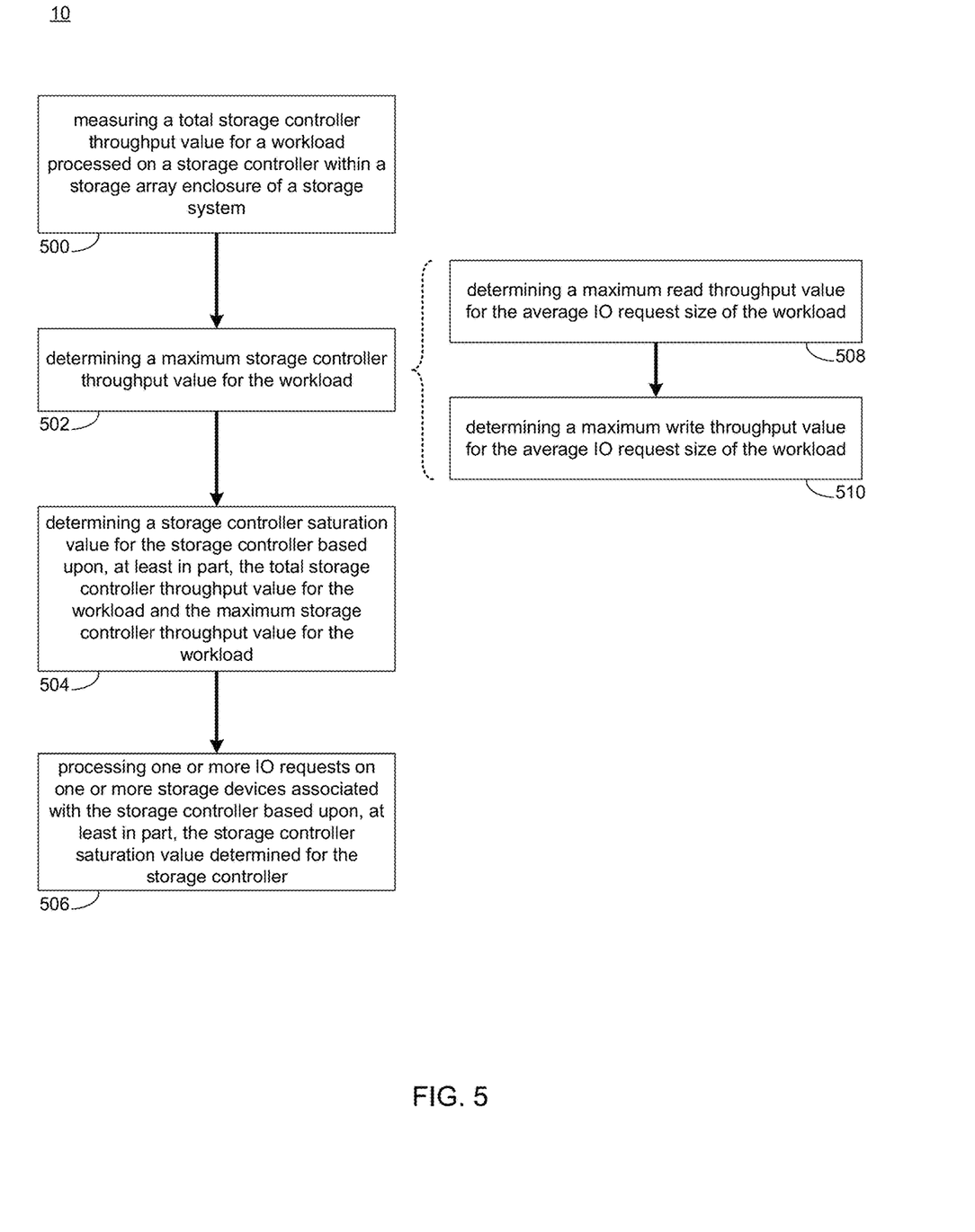
FIG. 5 is an example flowchart of storage saturation management process according to one or more example implementations of the disclosure.

Storage Controller Saturation:

Referring also to FIG. 5 and in some implementations, storage saturation management process 10 may measure 500 a total storage controller throughput value for a workload processed on a storage controller within a storage array enclosure of a storage system. A maximum storage controller throughput value may be determined 502 for the workload. A storage controller saturation value may be determined 504 for the storage controller based upon, at least in part, the total storage controller throughput value for the workload and the maximum storage controller throughput value for the workload. One or more IO requests may be processed 506 on one or more storage devices associated with the storage controller based upon, at least in part, the storage controller saturation value determined for the storage controller.

In some implementations, storage saturation management process 10 may measure 500 a total storage controller throughput value for a workload processed on a storage controller within a storage array enclosure of a storage system. For example and as discussed above, a storage controller (e.g., storage controller 422) may receive and process a plurality of IO requests on a storage device (e.g., storage devices 410, 412, 414). In some implementations and as with storage devices, controller saturation can be defined as a ratio of current controller throughput to the maximum supported controller throughput. In some implementations, the total storage controller throughput value may include a number of input/output operations per second (IOPS) and/or storage controller bandwidth.

As various IO requests are processed on the storage controller, storage saturation management process 10 may measure 500 the total storage controller throughput value for the workload. The workload may include a combination of one or more read IO requests and one or more write IO requests processed on the storage controller over a particular interval of time. Accordingly, storage saturation management process 10 may measure the combination of read IO requests and write IO requests processed on the storage controller over the defined time interval. In some implementations, the time interval may be user-defined and/or a default value. When measuring 500 the workload of IO requests performed on the storage controller, storage saturation management process 10 may determine the average IO request size.

In some implementations, storage saturation management process 10 may periodically measure the workload for a specific storage controller to determine if there has been a change. In one example, suppose storage saturation management process 10 determines that the average IO request size changes from four kilobytes to 256 kilobytes. In this example, storage saturation management process 10 may measure for the total storage controller throughput value for the changed workload on the storage controller. However, it will be appreciated that storage saturation management process 10 may measure the total storage controller throughput value based on a time threshold (e.g., iteratively after some period of time), a threshold number of IO requests processed, a threshold number of read IO requests processed, a threshold number of write IO requests processed, or any other metric within the scope of the present disclosure.

Suppose that storage saturation management process 10 measures 500 the throughput of a workload of read IO requests represented as 1,800 IOPS and of work IO requests represented as 900 IOPS when processing IO requests on storage controller. Further suppose that the average read IO request size is e.g., 256 kilobytes and that the average write IO request size is e.g., 256 kilobytes. In this example, storage saturation management process 10 may measure the read IO request throughput and the write IO request throughput separately. Accordingly, storage saturation management process 10 may measure 500 the total storage controller throughput by combining the read IO request throughput and the write IO request throughput (e.g., 1,800 IOPS+900 IOPS=2,700 IOPS). As will be discussed in greater detail below, storage saturation management process 10 may use this value to determine the storage controller throughput saturation for the workload.

In some implementations, storage saturation management process 10 may determine 502 a maximum storage controller throughput value for the workload. A maximum storage controller throughput for a particular workload may represent the maximum throughput the storage controller can process for the given workload. In some implementations, storage saturation management process 10 may determine 502 the maximum storage controller throughput value for a workload as a function of: a maximum read throughput value, a maximum write throughput value for the workload, and the average IO request size.

In some implementations, determining 502 the maximum storage controller throughput value for the workload may include determining 508 a maximum read throughput value for the average IO request size of the workload. For example, a maximum read throughput value may represent the maximum throughput for the storage controller when processing read IO requests. Continuing with the above example, suppose storage saturation management process 10 determines that the maximum read throughput value for storage controller 422 is 412,644 IOPS with four kilobyte read IO requests. In some implementations, this value may be user-defined, vendor-defined, defined by storage saturation management process 10, and/or predefined within storage controller 422. Accordingly, storage saturation management process 10 may use the maximum read throughput value of 412,644 with the average read IO request size of four kilobytes and the average read IO request size of 256 kilobytes in the workload for storage controller 422 to determine 508 a maximum read throughput value. For example, storage saturation management process 10 may determine 508 the maximum read throughput value as shown below in Equation 16:

$$\text{Max\_Controller\_IOPS}_{read@r\_256kB} = 412{,}644 * 4/256 = 6{,}447 \; IOPS \quad (16)$$

Accordingly, for the workload with an average read IO request size of 256 kilobytes, storage saturation management process 10 may determine 508 a maximum read throughput value of 6,447 IOPS.

In some implementations, determining 502 the maximum storage controller throughput value for the workload may include determining 510 a maximum write throughput value for the average IO request size of the workload. For example, a maximum write throughput value may represent the maximum throughput for the storage controller when processing write IO requests. Continuing with the above example, suppose storage saturation management process 10 determines that the maximum write throughput value for storage controller 422 is 100,000 IOPS with four kilobyte write IO requests. In some implementations, this value may be user-defined, vendor-defined, defined by storage saturation management process 10, and/or predefined within storage controller 422. Accordingly, storage saturation management process 10 may use the maximum write throughput value of 100,000 with the average write IO request size of four kilobytes and the average write IO request size of 256 kilobytes in the workload for storage controller 422 to determine 510 a maximum write throughput value. For example, storage saturation management process 10 may determine 510 the maximum write throughput value as shown below in Equation 17:

$$\text{Max\_Controller\_IOPS}_{write@r\_256kB} = 100{,}000 * 4/256 = 1{,}562 \; IOPS \quad (17)$$

Accordingly, for the workload with an average write IO request size of 256 kilobytes, storage saturation management process 10 may determine 510 a maximum write throughput value of 1,562 IOPS.

In some implementations, storage saturation management process 10 may determine a storage controller saturation value for the storage controller based upon, at least in part, the total storage controller throughput value for the workload and the maximum storage controller throughput value for the workload. For example, assume the workload for a storage controller includes a read IO throughput value (e.g., number of read IOPS) for an average read IO size and a write IO throughput value (e.g., number of write IOPS) for an average write IO size. The read ratio is defined as shown above in Equation 9.

Using the estimated maximum read throughput value and the maximum write throughput value for the storage controller, storage saturation management process 10 may determine an average service time per IO request as shown in Equation 10 above. Returning to the above example, storage saturation management process 10 may determine the read ratio and service time per IO request as shown below in Equations 18-19:

$$r = 1800/(1800 + 900) = 0.66 \quad (18)$$

$$s = (0.66/6447) + \left[\frac{1 - 0.66}{1562}\right] = 3.584e^{-4} \quad (19)$$

With the service time per IO request, storage saturation management process 10 may determine 502 the maximum storage controller throughput value for the workload as shown in Equation 20 below:

$$1/s = 1/3.584e^{-4} = 2{,}789 \; IOPS \quad (20)$$

As shown in Equation 20, the maximum storage controller throughput value for the workload is 2,789 IOPS. As will be discussed in greater detail below, storage saturation management process 10 may use the maximum storage controller throughput value to determine the storage controller saturation value.

In some implementations, storage saturation management process 10 may determine 504 a storage controller saturation value for the storage controller based upon, at least in part, the total storage controller throughput value for the workload and the maximum storage controller throughput value for the workload. A storage controller saturation value may represent the ratio of the total measured storage controller throughput value to the maximum storage controller throughput value for the workload. For example, storage saturation management process 10 may use the total storage controller throughput value for the workload and the maximum storage controller throughput value for the workload to determine 504 the storage controller saturation value as shown below in Equation 21:

$$\text{Storage Controller}_{Saturation} = \quad (21)$$
$$\text{total throughput value/maximum throughput value}$$

Continuing with the above example, storage saturation management process 10 may determine 504 the storage controller saturation value as shown in Equation 22

$$\text{Storage Controller}_{Saturation} = 2{,}700 \; IOPS/2{,}789 \; IOPS = 97\% \quad (22)$$

In this example, storage saturation management process 10 may determine 504 that the storage controller saturation value for storage controller 422 with the average IO request size of 256 kilobytes and 1,800 IOPS in read IO throughput and 900 in write IO throughput is 97%.

In some implementations, storage saturation management process 10 may process 506 one or more IO requests on one or more storage devices associated with the storage controller based upon, at least in part, the storage controller saturation value determined for the storage controller. For example, storage saturation management process 10 may compare the storage controller saturation value against one or more thresholds to determine whether or not to adjust the processing of IO requests on the storage controller. In one example, storage saturation management process 10 may compare the storage controller saturation value against an oversaturation threshold for the storage controller and/or for the storage array enclosure. For example, storage saturation management process 10 may compare the storage controller saturation value of multiple storage controllers to determine whether to perform load balancing between the storage controllers and/or whether to offload processing from one storage controller to another storage controller. In another example, storage saturation management process 10 may generate an alert to an administrator of the storage system to alert when the storage controller saturation value exceeds or descends below a predefined saturation threshold. In another example, storage saturation management process 10 may adjust the IO request processing rate, a queue depth for IO requests for storage devices associated with the storage controller, the IO size, etc. Accordingly, storage saturation management process 10 may perform various remedial or optimizations of the processing of IO requests using the storage controller saturation value.

Figure 6:
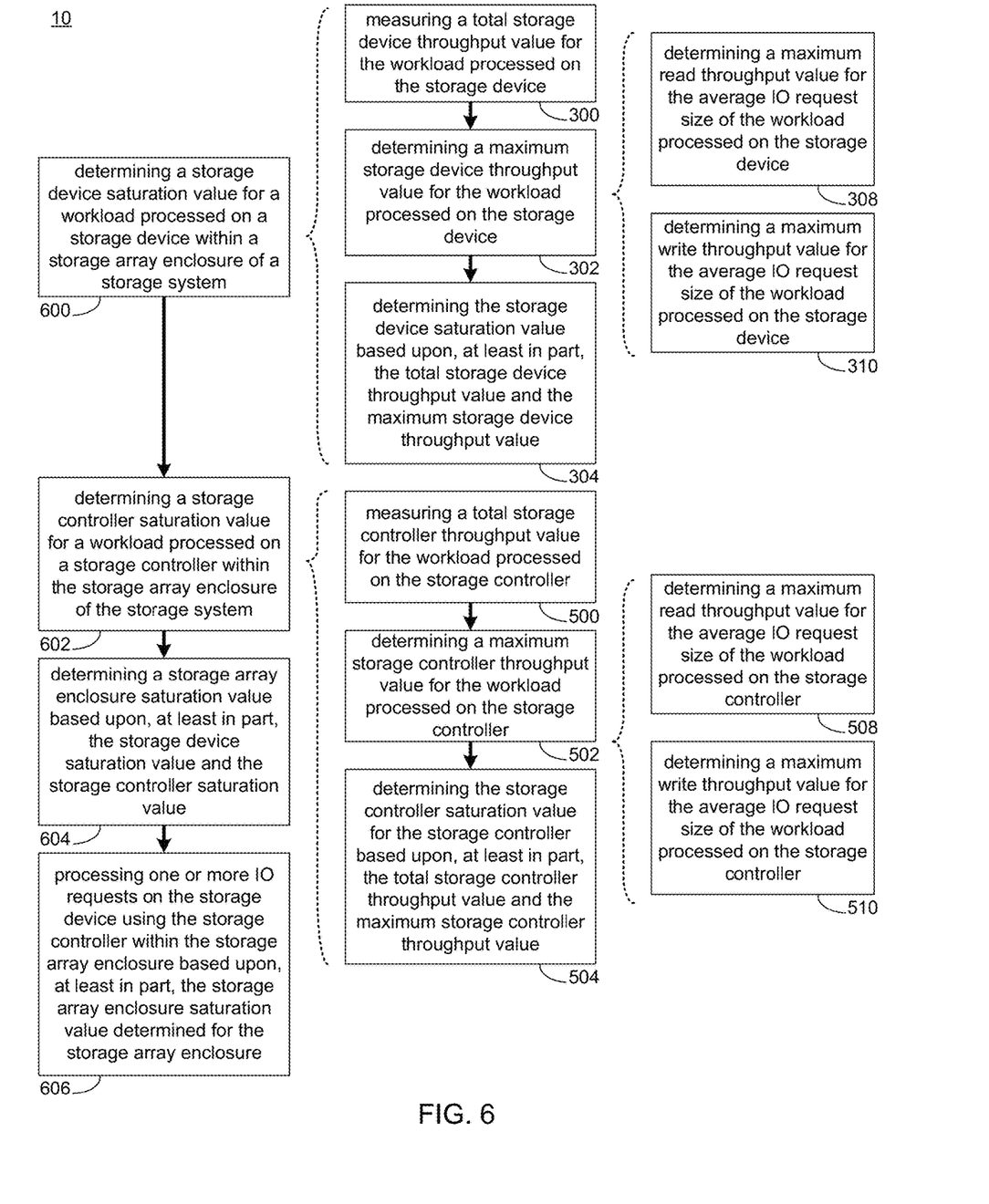
FIG. 6 is an example flowchart of storage saturation management process according to one or more example implementations of the disclosure.

Storage Array Enclosure Saturation:

Referring also to FIG. 6 and in some implementations, storage saturation management process 10 may determine 600 a storage device saturation value for a workload processed on a storage device within a storage array enclosure of a storage system. A storage controller saturation value may be determined 602 for a workload processed on a storage controller within the storage array enclosure of the storage system. A storage array enclosure saturation value may be determined 604 based upon, at least in part, the storage device saturation value and the storage controller saturation value. One or more IO requests may be processed 606 on the storage device using the storage controller within the storage array enclosure based upon, at least in part, the storage array enclosure saturation value determined for the storage array enclosure.

A storage array enclosure typically includes several sub-systems as shown in FIG. 4. For example, each storage array enclosure (e.g., storage array enclosures 406, 408) of storage array 112 may include one or more storage controllers (e.g., storage controllers 422, 424, 426, 428), physical links/lanes upstream/downstream of the storage controllers (represented in FIG. 4 as the arrows between storage processors 100 and 124 and each respective storage controller and between each storage controller and respective storage devices), and storage devices (e.g., storage devices 410, 412, 414, 416, 418, 420).

As will be discussed in greater detail below, storage saturation management process 10 may determine a storage array enclosure saturation value by determining the saturation value of each sub-system within the storage array enclosure. For example, storage saturation management process 10 may determine the saturation in the physical links/lanes upstream and downstream of the storage controllers of the storage array enclosure as a ratio of the current throughput and the maximum throughput. Storage saturation management process 10 may determine the saturation of each storage controller and the saturation of each storage device. With each of these saturation levels, storage saturation management process 10 may determine the storage array enclosure saturation value as the maximum of the saturation values of its subsystems. In this manner, storage saturation management process 10 may identify any bottlenecks in the performance of a storage system by projecting the saturation of a subsystem of a storage array enclosure to the saturation of the storage array enclosure generally.

In some implementations, storage saturation management process 10 may determine 600 a storage device saturation value for a workload processed on a storage device within a storage array enclosure of a storage system. For example and as discussed above, a storage device saturation value for a workload processed on a storage device includes a ratio of the total measured storage device throughput value to the maximum storage device throughput value for the workload. For example, storage saturation management process 10 may use the total storage device throughput value for the workload and the maximum storage device throughput value for the workload to determine 600 the storage device saturation value as shown above in Equation 14 and again below:

$$\text{Storage Device}_{Saturation} = \quad (14)$$
$$\text{total throughput value/maximum throughput value}$$

As described in the example above, suppose storage saturation management process 10 determines that the total throughput value for a particular workload is 2,000 IOPS (e.g., 1,400 read IOPS and 600 write IOPS). Additionally, suppose that storage saturation management process 10 determines the maximum throughput value for the workload to be 2,613 IOPS. Accordingly, storage saturation management process 10 may determine 600 the storage device saturation value as shown in Equation 15:

$$\text{Storage Device}_{Saturation} = 2{,}000 \; IOPS/2613 \; IOPS = 77\% \quad (15)$$

In this example, storage saturation management process 10 may determine 600 that the storage device saturation value for a storage device with the average IO request size of 256 kilobytes and 1,400 IOPS in read IO throughput and 600 in write IO throughput is 77%.

In some implementations, storage saturation management process 10 may determine 602 a storage controller saturation value for a workload processed on the storage controller. For example and as discussed above, a storage controller saturation value for a workload processed on the storage controller includes the ratio of the total measured storage controller throughput value to the maximum storage controller throughput value for the workload. For example, storage saturation management process 10 may use the total storage controller throughput value for the workload and the maximum storage controller throughput value for the workload to determine 602 the storage controller saturation value as shown above in Equation 21 and again below:

$$\text{Storage Controller}_{Saturation} = \text{total throughput value}/\text{maximum throughput value} \quad (21)$$

As described in the example above, storage saturation management process 10 may determine 602 the storage controller saturation value as shown in Equation 22

$$\text{Storage Controller}_{Saturation} = 2{,}700 \; IOPS/2{,}789 \; IOPS = 97\% \quad (22)$$

In this example, storage saturation management process 10 may determine 602 that the storage controller saturation value for a storage controller with the average IO request size of 256 kilobytes and 1,800 IOPS in read IO throughput and 900 in write IO throughput is 97%.

In some implementations, storage saturation management process 10 may determine 604 a storage array enclosure saturation value based upon, at least in part, the storage device saturation value and the storage controller saturation value. For example, storage saturation management process 10 may determine the saturation of each subsystem in the storage array enclosure. As discussed above, storage saturation management process 10 may determine the storage device saturation value for each storage device and the storage controller saturation value for each storage controller. In some implementations, storage saturation management process 10 may determine the saturation value for the physical links or lanes upstream and/or downstream from each storage controller. Accordingly, storage saturation management process 10 may compare each of the saturation values for each subsystem of the storage array enclosure and identify the maximum or highest saturation value. For example, suppose that storage saturation management process 10 determines that storage device 410 has the highest storage device saturation value at 77%; that storage controller 422 has the highest storage controller saturation value at 97%; and that the saturation value for the physical links between each storage controller are 30%. In this example, storage saturation management process 10 may determine 604 the storage array enclosure saturation value as the highest saturation value (e.g., 97% from the storage controller saturation value). While the above example references a single storage device saturation value and a single storage controller saturation value, it will be appreciated that any number of storage device saturation values and/or storage controller saturation values may be determined within the scope of the present disclosure.

In some implementations, storage saturation management process 10 may process 606 one or more IO requests on the storage device using the storage controller within the storage array enclosure based upon, at least in part, the storage array enclosure saturation value determined for the storage array enclosure. For example, storage saturation management process 10 may compare the storage array enclosure saturation value against one or more thresholds to determine whether or not to adjust the processing of IO requests on the storage array enclosure. In one example, storage saturation management process 10 may compare the storage array enclosure saturation value against an oversaturation threshold for the storage array enclosure.

For example, storage saturation management process 10 may compare the storage array enclosure saturation value of multiple storage array enclosure to determine whether to perform load balancing between the storage array enclosures and/or whether to offload processing from one storage array enclosure to another storage array enclosure. In another example, storage saturation management process 10 may generate an alert to an administrator of the storage system to alert when the storage array enclosure saturation value exceeds or descends below a predefined saturation threshold. In another example, storage saturation management process 10 may adjust the IO request processing rate, a queue depth for IO requests for storage devices associated with the storage controller on the storage array enclosure, the IO size, etc. Accordingly, storage saturation management process 10 may perform various remedial or optimizations of the processing 606 of IO requests using the storage array enclosure saturation value.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    measuring a total storage device throughput value for a workload processed on a storage device within a storage array enclosure of a storage system, wherein the workload includes an average IO request size;
    determining a maximum storage device throughput value for the workload, wherein determining the maximum storage device throughput value for the workload includes:
        determining a maximum read throughput value for the average IO request size of the workload;
        determining a maximum write throughput value for the average IO request size of the workload;
        determining a read ratio as a function of read IO throughput and write IO throughput; and
        determining an average service time per IO request as a function of the maximum read throughput value for the average IO request size for the workload and the maximum write throughput value for the average IO request size for the workload;

determining a storage device saturation value for the storage device based upon, at least in part, the total storage device throughput value for the workload and the maximum storage device throughput value for the workload; and processing one or more IO requests on the storage device based upon, at least in part, the storage device saturation value determined for the storage device.

2. The computer-implemented method of claim 1, wherein the storage device is a solid state drive (SSD) storage device.

3. The computer-implemented method of claim 1, wherein the storage device is a hard disk drive (HDD) storage device.

4. The computer-implemented method of claim 1, wherein the workload includes a combination of one or more read IO requests and one or more write IO requests processed on the storage device.

5. A computer program product residing on a non-transitory computer readable medium having a plurality of instructions stored thereon which, when executed by a processor, cause the processor to perform operations comprising:

measuring a total storage device throughput value for a workload processed on a storage device within a storage array enclosure of a storage system, wherein the workload includes an average IO request size;

determining a maximum storage device throughput value for the workload, wherein determining the maximum storage device throughput value for the workload includes:

determining a maximum read throughput value for the average IO request size of the workload;

determining a maximum write throughput value for the average IO request size of the workload;

determining a read ratio as a function of read IO throughput and write IO throughput; and determining an average service time per IO request as a function of the maximum read throughput value for the average IO request size for the workload and the maximum write throughput value for the average IO request size for the workload;

determining a storage device saturation value for the storage device based upon, at least in part, the total storage device throughput value for the workload and the maximum storage device throughput value for the workload; and processing one or more IO requests on the storage device based upon, at least in part, the storage device saturation value determined for the storage device.

6. The computer program product of claim 5, wherein the storage device is a solid state drive (SSD) storage device.

7. The computer program product of claim 5, wherein the storage device is a hard disk drive (HDD) storage device.

8. The computer program product of claim 5, wherein the workload includes a combination of one or more read IO requests and one or more write IO requests processed on the storage device.

9. A computing system comprising:

a memory; and a processor configured to measure a total storage device throughput value for a workload processed on a storage device within a storage array enclosure of a storage system, wherein the processor is further configured to determine a maximum storage device throughput value for the workload, wherein the workload includes an average IO request size;

wherein the processor is further configured to determining a maximum storage device throughput value for the workload, wherein determining the maximum storage device throughput value for the workload includes:

determining a maximum read throughput value for the average IO request size of the workload;

determining a maximum write throughput value for the average IO request size of the workload;

determining a read ratio as a function of read IO throughput and write IO throughput;

determining an average service time per IO request as a function of the maximum read throughput value for the average IO request size for the workload and the maximum write throughput value for the average IO request size for the workload; and determine a storage device saturation value for the storage device based upon, at least in part, the total storage device throughput value for the workload and the maximum storage device throughput value for the workload, and wherein the processor is further configured to process one or more IO requests on the storage device based upon, at least in part, the storage device saturation value determined for the storage device.

10. The computing system of claim 9, wherein the storage device is a solid state drive (SSD) storage device.

11. The computing system of claim 9, wherein the storage device is a hard disk drive (HDD) storage device.

12. The computing system of claim 9, wherein the workload includes a combination of one or more read IO requests and one or more write IO requests processed on the storage device.

* * * * *